United States Patent [19]

Sameh, Abdel H. A. et al.

[11] Patent Number: 5,419,881
[45] Date of Patent: May 30, 1995

[54] PROCESS FOR TREATING DISSOLUTION RESIDUES

[75] Inventors: Sameh, Abdel H. A., Ettlingen; Anne Bertram-Berg, Karlsruhe, both of Germany

[73] Assignee: Kernforschungszenlrum Karlsruhe GmbH, Karlsruhe, Germany

[21] Appl. No.: 272,830

[22] Filed: Jul. 11, 1994

[30] Foreign Application Priority Data

Sep. 24, 1992 [DE] Germany .................... 42 41 955.2

[51] Int. Cl.⁶ ................................................. B01F 1/00
[52] U.S. Cl. ............................................. 423/20; 423/3
[58] Field of Search ................................. 423/3, 4, 20

[56] References Cited

U.S. PATENT DOCUMENTS

| | | | |
|---|---|---|---|
| 3,022,160 | 2/1962 | Brandt | 156/664 |
| 3,436,354 | 4/1969 | Gemmill, Sr. et al. | 424/161 |
| 4,701,310 | 10/1987 | Pallock | 423/16 |
| 4,762,695 | 8/1988 | Endo et al. | 423/54 |
| 4,793,978 | 12/1988 | Pollock | 423/16 |

FOREIGN PATENT DOCUMENTS

| | | |
|---|---|---|
| 0197271 | 10/1986 | European Pat. Off. . |
| 1554064 | 12/1968 | France . |
| 1020899 | 1/1986 | Japan . |
| 2229312 | 9/1990 | United Kingdom . |
| 69381088 | 12/1981 | U.S.S.R. . |

*Primary Examiner*—Ngoclan T. Mai
*Attorney, Agent, or Firm*—Klaus J. Bach

[57] ABSTRACT

In a process for treating dissolution residues which are generated in the recovery of fission products, particularly fission molybdenum, wherein nuclear fuel comprising the elements uranium, silicon and aluminum is irradiated and subsequently treated with an alkaline solution from which any dissolution residues are separated, the dissolution residues are dissolved in an additional hydrogen peroxide containing solution to which an acid and iodine or an iodine compound is added whereby a complete dissolution of the residues is achieved.

6 Claims, No Drawings

PROCESS FOR TREATING DISSOLUTION RESIDUES

The present application is a continuation-in-part application of International application PCT/EP93/02250 filed Aug. 21, 1993 and claiming priority or German application P 42 31 955.2 of Sep. 24, 1992.

BACKGROUND OF THE INVENTION

The invention relates to a process for treating dissolution residues generated in the recovery of fission products, especially fission molybdenum.

For the production or fission products, especially fission molybdenum, nuclear fuels comprising the elements uranium, silicium and aluminum are particularly suitable. Such nuclear fuels may consist of an alloy or these elements (for example, $U_3SiAl$) or of uraniumsilicide, which is enclosed in a cladding or aluminum or an aluminum alloy.

The nuclear fuel is shortly irradiated in a react or whereby fission products are generated from the $235_U$ contained in the nuclear fuel. Among those fission products the radioactive isotope $^{99}Mo$ is of particular interest because radioactive decay thereof with a radioactive half-time of exchange or 66 hours, results in the isotope $^{99m}Tc$ which is used in medical diagnostics and which itself has a half-time or exchange or 6 hours.

If irradiated nuclear fuels or this type, such as $U_3SiAl$ or aluminum-cladded uraniumsilicide, are treated with an alkali hydroxide solution, the aluminum and part of the fission products are dissolved, but a large part of the fission products remain in the solution residue, particularly the main part of the fission molybdenum (depending on the particle size of the irradiated uraniumsilicide nuclear fuel between 75 and 85%) together with the uranium and the silicon).

It has been tried (K. A. Burill, R. J. Harrison: "Development of the $^{99}Mo$ process at CRNL"; Proc. of a Tech. Com. Meeting by IAEA-TECDOC-515, p. 35) to dissolve nuclear fuels directly by nitric acid out of an irradiated $U_3SiAl$ alloy, that is, without preceding treatment with an alkaline solution. But it has been found that, then, up to 50% of the molybdenum is lost by the formation of gel-like species of silica. It has further been tried (G. F. Vandegrift, J. D. Kwok, S. L. Marshall, D. R. Vissers, J. E. Matos: "Continuing Investigations of Technical Assessment of $^{99}Mo$ production from LEV targets"; Proc. of a Tech. Com. Meeting by IAEA from the 13th to 16th Oct. 1987. ,Karlsruhe, IAEA-TECQOC-515, p. 115) to dissolve the dissolution residue, which was generated during treatment of (non-irradiated) nuclear fuels of this type by an alkaline solution, with an additional solution consisting of 30% concentrated hydrogen peroxide and caustic soda solution. In this respect it has been reported that, although the residue could be dissolved, substantial problems have been encountered by the release of excess hydrogen peroxide as a result of which it became impossible to fully separate the uranium during the following recovery process.

It is well known that the treatment of the dissolution residue with a solution of 30% concentrated hydrogen peroxide and caustic soda solution is a risky procedure since, in the process, in the presence of fission noble metals and oxidic corrosion products, hydrogen peroxide can react spontaneously resulting in an explosion.

EP 0 197 271 Al discloses a process for the manufacture of highly refined molybdenum or molybdenum oxide powder, wherein molybdenum or molybdenum oxide powder is treated with a watery, preferably 5 to 35% concentrated hydrogen peroxide solution, whereby a molybdenum-containing solution is formed. A strong mineral acid may be admixed to the hydrogen peroxide solution. The molybdenum-containing solution is contacted by a cation exchanger and then concentrated. The solid components of the concentrated solution can be reduced by hydrogen to molybdenum. The process does not utilize the dissolution residues which are generated in the recovery of fission products, particularly fission molybdenum.

From GB 2 229 312 A it is known to dissolve actimides or fission products with a solution which contains hydrogen peroxide and a complex-forming agent such as citrate. During dissolution the pH value is to be maintained above 5.5.

Finally, it is known from World Patent Index Latest, AM:86-071874/11 concerning J6102088A to dissolve cladding material of nuclear fuel with attached deposits of Mo and others in an alkaline solution of sodium hydroxide and hydrogen peroxide and subsequently with nitric acid.

It is the principal object of the present invention to safely and as much as possible totally dissolve the dissolution residues in a method of the type described above without encountering problems with the subsequent processing steps for the isolation of the fission products, particularly the molybdenum and the uranium.

SUMMARY OF THE INVENTION

In a process for treating dissolution residues which are generated in the recovery of fission products, particularly fission molybdenum, wherein nuclear fuel comprising the elements uranium, silicium and aluminum is irradiated and subsequently treated with an alkaline solution from which any dissolution residues are separated, the dissolution residues are dissolved in an additional hydrogen peroxide containing solution to which an acid and iodine or an iodine compound is added whereby a complete dissolution of the residues is achieved.

Preferably, hydrofluoric acid is used as the acid. The conversion with an acid, for example, with hydrofluoric acid only, would follow the following formula:

$$U_3Si_2 + 24HF \rightarrow 3UF_4 + 2H_2[SiF_6] + 10H_2 \tag{1}$$

Without the addition of hydrogen peroxide however, the reaction would soon be terminated, since the uraniumsilicide crystals would soon be surrounded by a green $UF_4$ layer which is difficult to dissolve in acids (such as hydrofluoric acid) as it prevents or at least inhibits further penetration of the hydrofluoric acid so that the reaction would be essentially terminated.

In the presence of hydrogen peroxide, however, the four-valent uranium formed in the process is converted to the easier soluble six-valent oxidation stage in which form it cannot form a protective layer, so that further action of the acid is not prevented. However, it is necessary in this case of to utilize hydrogen peroxide in a large excess since most the hydrogen peroxide escapes from the solution unused and must continuously be replaced by new peroxide. Such a procedure however is not acceptable during dissolution of dissolution residues generated during processing of irradiated nuclear fuels.

Therefore, in accordance with the invention, iodine or an iodine compound is added to the solution by which the residues are dissolved. As iodine compound, particularly an inorganic preferably easily soluble salt, may be used in which iodine is present in any oxidation stage. A well suitable iodine compound is, for example, potassium periodate. With the addition of periodate, uraniumsilicide can be rapidly and completely dissolved without the need for excessive amounts hydrogen peroxide.

If the dissolution residue of uraniumsilicide and fission products is dissolved in a solution, which, in addition to the acid and the hydrogen peroxide contains iodine or an iodine compound, the iodine compounds, under the given conditions, are reduced to elemental iodine. The elemental iodine reacts with the nascent hydrogen which is generated in accordance with reaction equation (1) to form hydrogen iodide. The hydrogen iodide reacts with the hydrogen peroxide according to the reaction equation.

$$2HI + H_2O_2 \rightarrow I_2 = 2H_2O \qquad (2)$$

to form again iodine which reenters the cycle described.

Consequently, with the process described, iodine acts as a catalyst; the catalyst can also be provided with the addition of an iodine compound.

The solution with which the dissolution residues from the alkaline treatment of the irradiated nuclear fuel can be further processed contains 1 to 7 mol/l of a mineral acid wherein hydrofluoric acid is much preferred, further 5 to 15% hydrogen peroxide and at least 0.01 mol/l of iodine and/or an iodine compound. Concentrations of iodine and/or iodine compounds of more than 0.02 mol/l are usually not necessary and would lead to an avoidable contamination of the solution.

With the process according to the invention the dissolution residue can be fully dissolved if the concentration of the solution components are selected appropriately. Therefore all the fission products, particularly fission molybdenum, can be fully processed. No radioactive dissolution residues remain which would still include fission products that would, in principle, still be usable, and which would cause additional expenses for proper disposal. A particular advantage of the process according to the invention resides in the fact that the dissolution occurs very rapidly. The dissolution time for the residue however depends on the grain size; with a medium grain size of 60 μm, the reaction is completed within 30 minutes. Consequently, the time within which the container material (usually stainless steel) is exposed to the corrosive action of the solution is quite limited.

A further advantage of the process according to the invention resides in the fact that the dissolution procedure can be performed at low temperatures, for example, at temperatures of 15° C. to 25° C. With these low temperatures the corrosive effects on the container material are further reduced.

The process according to the invention provides, at low temperatures, for an operationally safe, fast and uniformly proceeding conversion of irradiated and non-irradiated $U_3Si_2$ alloys and residues after preceding dissolution or removal of the aluminum or aluminum alloy cladding. Because of the uniform progress of the conversion process, wear of the container can be highly localized. If required the portion of the container which is contacted by the most corrosive solution can be protected by first spray-coating it with a chemically inert protective film of polyethylene or polytetrafluoroethylene.

EXAMPLES OF THE PROCESS ACCORDING TO THE INVENTION AND TEST RESULTS

In order to maintain test conditions as realistically as possible, residues from alkaline solvent solutions of unirradiated uraniumsilicide plates as they are made in the manufacturing process were used. Separation of the dissolution residues occurred in a filter.

With a view to obtaining exact and reproducible data, the dissolution residue was boiled for 30 minutes with 4-molar caustic soda solution in order to remove container corrosion products and cladding material residues retained by the filter with the uraniumsilicide. After filtration of the solution the remaining residue was washed with water until the wash water was colorless. Subsequently, the residue was removed from the filter container and dried overnight in a protective argon gas chamber at a temperature of about 150° C. The subsequently performed experiments were conducted with samples of the residue treated in this manner.

To a measured amount of the residue a predetermined amount of hydrofluoric acid, hydrogen peroxide and potassium-periodate was added and left in contact therewith for a predetermined time at 20° C. for reaction.

At the end of the predetermined contact time the reaction was interrupted by the addition of an excess amount of potassium hydroxide and the solution was boiled for an hour, with return of the condensed vapors, for the removal of the remaining hydrogen peroxide. During this procedure, all the uranium precipitates as diuranate.

Subsequently the solids are separated by centrifuging and washed several times with potassium hydroxide.

The solids were then treated with 3-molar nitric acid at room temperature. In this step, the diuranate was dissolved while a black rest of undissolved uraniumsilicide remained. After removal of this rest by centrifuging the uranium content in the nitric acid solution was determined. The nitric acid solution is the first measuring solution and is designated by M1.

The undissolved rest was separately treated with a solution consisting of 5-molar hydrofluoric acid, 2.45-molar hydrogen peroxide and 0.05-molar potassium periodate, whereby the rest was totally dissolved within 15 minutes. As described above, potassium hydroxide was added to the solution in excess. This solution is the second measuring solution and is designated by M2.

The uranium concentrations in the respective corresponding solutions M1 and M2 were determined UV-spectroscopically by comparison with standard uranium solutions in [mol/l] and, subsequently mathematically converted to [mol] taking into consideration their respective volumina. From the measuring samples M1 and M2 the total uranium content could be obtained and therefrom the uranium content in M1 on a percentage basis in relation to the total treated amount of uranium ($U_{total}$).

Concerning the dependency of the dissolution rate of the potassium periodate concentration:

The tests were performed with 5-molar hydrofluoric acid in 7.5% concentrated hydrogen peroxide. The period of contact between the solution and the residue was 15 minutes.

Concentration of:

| KIO [mol/l] | Uranium in M1 [$10^{-3}$ mol/l] | Uranium in M2 [$10^{-3}$ mol/l] | $U_{total}$ [$10^{-3}$ mol/l] | Uranium in M1 [%] of $U_{total}$ |
|---|---|---|---|---|
| 0 | 0,135 | 0,44 | 0,575 | 23,47 |
| 0,0011 | 0,161 | 0,35 | 0,511 | 31,37 |
| 0,0029 | 0,225 | 0,317 | 0,542 | 41,5 |
| 0,0054 | 0,357 | 0,354 | 0,711 | 50,21 |
| 0,0073 | 0,366 | 0,266 | 0,632 | 57,91 |
| 0,0093 | 0,44 | 0,172 | 0,612 | 71,89 |
| 0,0118 | 0,595 | 0,118 | 0,713 | 83,43 |
| 0,0147 | 0,522 | 0,010 | 0,532 | 98,15 |
| 0,0205 | 0,541 | 0 | 0,541 | 100,00 |

From these data it is apparent that, with a solution which contains the hydrofluoric acid and hydrogen peroxide in the concentrations given above and potassium periodate in a concentration of at least 0.02 mol/l uraniumsilicide can be completely dissolved. Even with a solution which contains only 0.01 mol/l potassium periodate most of the uraniumsilicide is dissolved.

Concerning the dependency of the dissolution rate on the contact time:

The tests were performed with 5-molar hydrofluoric acid, 7.5% concentrated hydrogen peroxide end 0.0093 mol/l potassium periodate.

Concentration of:

| Time [min] | Uranium in M1 [$10^{-3}$ mol/l] | Uranium in M2 [$10^{-3}$ mol/l] | $U_{total}$ [$10^{-3}$ mol/l] | Uranium in M1 [%] of $U_{total}$ |
|---|---|---|---|---|
| 10 | 0,277 | 0,254 | 0,531 | 52,16 |
| 15 | 0,44 | 0,172 | 0,612 | 71,89 |
| 20 | 0,578 | 0,144 | 0,722 | 80,06 |
| 25 | 0,524 | 0,067 | 0,591 | 88,70 |
| 30 | 0,966 | 0,090 | 1,056 | 91,47 |

From these data it is apparent that more than 90% of the uraniumsilicide is dissolved during a contacting time of 300 minutes even if the solvent contains only about 0.01 mol/l potassium periodate.

Concerning the dependency of the dissolution rate ate on the concentration of hydrogen peroxide:

The tests were performed with 5-molar hydrofluoric acid and 0.0093 mol/l potassium periodate. The contacting time was 15 minutes.

Concentration of:

| $H_2O_2$ [%] | Uranium in M1 [$10^{-3}$ mol/l] | Uranium in M2 [$10^{-3}$ mol/l] | $U_{total}$ [$10^{-3}$ mol/l] | Uranium in M1 [%] of $U_{total}$ |
|---|---|---|---|---|
| 7,5 | 0,44 | 0,172 | 0,612 | 71,89 |
| 6,0 | 0,328 | 0,191 | 0,519 | 63,2 |
| 4,5 | 0,30 | 0,19 | 0,49 | 61,4 |
| 3,0 | 0,248 | 0,22 | 0,468 | 52,99 |
| 1,5 | 0,189 | 0,168 | 0,357 | 52,94 |

With lower hydrogen peroxide content the solubility of uraniumsilicide is also lower.

Concerning the dependency of the dissolution rate on the concentration of the hydrofluoric acid:

In the range of 1-molar to 7-molar hydrofluoric acid no change in the dissolution rate could be determined.

What is claimed is:

1. A process for treating dissolution residues generated in the recovery of fission products, particularly fission molybdenum, wherein nuclear fuel comprising the elements uranium, silicium and aluminum is irradiated and subsequently treated with an alkaline solution and any dissolution residues are then separated from the solution, comprising the step of:
   dissolving the dissolution residues in an additional hydrogen peroxide-containing solution to which an acid and iodine or iodine compound has been added.

2. A process according to claim 1, wherein said acid is hydrofluoric acid.

3. A process according to claim 1, wherein said iodine compound is an easily soluble inorganic salt.

4. A process according to claim 3, wherein said easily soluble inorganic salt is a periodate.

5. A process according to claim 1, wherein the dissolution residues are dissolved in said additional solution at a temperature of 15° C. to 25° C.

6. A process according to claim 1, wherein the dissolution of said residue is performed in a metallic container provided at its inside with an inert protective coating.

* * * * *